(12) United States Patent
Matheson et al.

(10) Patent No.: US 7,909,496 B2
(45) Date of Patent: Mar. 22, 2011

(54) LIGHTING SYSTEM FOR CREATING AN ILLUMINATED SURFACE

(75) Inventors: George E Matheson, North Vancouver (CA); Ingo Speier, Saanichton (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 291 days.

(21) Appl. No.: 12/162,347

(22) PCT Filed: Feb. 1, 2007

(86) PCT No.: PCT/CA2007/000130
§ 371 (c)(1),
(2), (4) Date: Jul. 26, 2008

(87) PCT Pub. No.: WO2007/087710
PCT Pub. Date: Aug. 9, 2007

(65) Prior Publication Data
US 2009/0196071 A1   Aug. 6, 2009

Related U.S. Application Data

(60) Provisional application No. 60/763,966, filed on Feb. 1, 2006, provisional application No. 60/826,097, filed on Sep. 19, 2006.

(51) Int. Cl.
*F21V 7/04* (2006.01)
(52) U.S. Cl. ......... 362/609; 362/616; 362/308; 362/310
(58) Field of Classification Search .................... 362/24, 362/26, 27, 29, 97.1, 97.2, 97.3, 231, 235, 362/555, 561, 559, 601, 602, 609, 615, 616, 362/622, 623, 625–627, 630, 631, 800, 806, 362/812; 40/541, 546, 550, 551, 552, 581, 569; 349/56, 58, 61, 62, 98
See application file for complete search history.

(56) References Cited

U.S. PATENT DOCUMENTS
5,249,104 A * 9/1993 Mizobe .......................... 362/605
(Continued)

FOREIGN PATENT DOCUMENTS
JP       2001042327 A * 2/2001
(Continued)

OTHER PUBLICATIONS

"LED Backlighting From Revolution to Reality", Teh 6th Annual Display Search US FPD Conference, Mar. 30-Apr. 1, 2004.

*Primary Examiner* — Hargobind S Sawhney

(57) ABSTRACT

The present invention combines point light sources in combination with a light guide element and light redirecting elements into a system which can emit light across one or more extended surfaces of the light guide and may be designed to be able to emit light uniformly across the extended surfaces. The system comprises one or more light-emitting elements and a light guide in which are defined one or more voids. The light-emitting elements are optically coupled to the light guide by positioning them adjacent to a surface of the light guide, or by positioning them proximal to one or more of the voids. One or more light-emitting elements can be optically coupled to one void such that they emit light into the light guide substantially through that void and not through any other void of the one or more voids. Optically coupled to the light guide are a plurality of light redirecting elements for altering of the propagation of light through the light guide, thereby enabling light to be emitted from the surface of the light guide in a desired pattern, for example in a uniform illumination pattern.

23 Claims, 13 Drawing Sheets

U.S. PATENT DOCUMENTS

| | | | |
|---|---|---|---|
| 5,641,219 A | 6/1997 | Mizobe | |
| 6,166,860 A * | 12/2000 | Medvedev et al. | 359/641 |
| 6,386,721 B1 | 5/2002 | Hosseini et al. | |
| 6,598,998 B2 * | 7/2003 | West et al. | 362/307 |
| 6,951,415 B2 * | 10/2005 | Amano et al. | 362/520 |
| 7,052,152 B2 * | 5/2006 | Harbers et al. | 362/30 |
| 7,063,430 B2 * | 6/2006 | Greiner | 362/30 |
| 7,109,450 B2 * | 9/2006 | Kaji et al. | 219/620 |
| 7,111,969 B2 * | 9/2006 | Bottesch et al. | 362/517 |
| 7,478,942 B2 * | 1/2009 | Kim et al. | 362/620 |
| 7,557,781 B2 * | 7/2009 | Chuang et al. | 345/82 |
| 7,708,444 B2 * | 5/2010 | Sakai et al. | 362/615 |
| 2006/0203513 A1 * | 9/2006 | Aoki | 362/612 |
| 2006/0285311 A1 * | 12/2006 | Chang et al. | 362/97 |
| 2007/0086179 A1 * | 4/2007 | Chen et al. | 362/27 |
| 2008/0055931 A1 * | 3/2008 | Verstraete et al. | 362/612 |

FOREIGN PATENT DOCUMENTS

| | | | |
|---|---|---|---|
| JP | 2004045939 A | * | 2/2004 |
| JP | 2006066236 A | * | 3/2006 |
| WO | 03083562 A | | 10/2003 |
| WO | 2003083564 A1 | | 10/2003 |

* cited by examiner

LIGHTING SYSTEM FOR CREATING AN ILLUMINATED SURFACE

CROSS-REFERENCE TO RELATED APPLICATIONS

This application is a national stage application under 35 U.S.C. §371 of International Application No. PCT/CA2007/000130 filed on Feb. 1, 2007 and published in the English language on Aug. 9, 2007 as International Publication No. WO2007/087710, which claims priority to (i) U.S. Provisional Application Ser. No. 60/763,966, filed on Feb. 1, 2006 and (ii) U.S. Provisional Application Ser. No. 60/826,097, filed on Sep. 19, 2006, all of which are hereby incorporated herein by reference.

FIELD OF THE INVENTION

The present invention pertains to lighting systems and in particular to a lighting system for creating an illuminated surface.

BACKGROUND

Large bodies capable of uniformly generating and emitting light across an extended two-dimensional surface, for example, light-emitting foils which can be used in panel or back lighting systems, are presently unavailable. However, light guides are common elements in contemporary display and lighting technology. In combination with a plurality of suitably placed light-extracting elements light guides can be utilized to implement large sized panels which can generate uniform lighting impressions. Such a system can redirect light emitted from one-dimensional extended tubular or point light sources positioned along the edge of the panel such as described in International Patent Application Publications WO 03/083564 and WO 03/083562. These patent applications disclose thin back lighting systems based on edge lighting of acrylic sheets with front-emitting light-emitting diodes along the periphery and a machined light extracting pattern on a surface of the acrylic sheet.

As previously defined, edge lighting utilizes substantially one-dimensional light sources positioned along the periphery of the panel or rows of point light sources. Edge lighting is widely used in back lit displays and screens with screen sizes of up to approximately half a meter measured along the diagonal. However, edge lighting limits the maximum panel size which can be uniformly illuminated because of light attenuation and aberration due to optical effects inside and at the edge of the panel or light guide. For various reasons, these effects cannot be compensated by providing increased amounts of light at the edge of the light guide to build substantially arbitrarily large panels. Furthermore, the placement of light-extracting elements needs to be customized for the size of the panel which economically impedes arbitrary panel size scaling.

The scale-up limitation in large screen display technology has been addressed and a solution was published summarizing the state of the art in "LED Backlighting from Revolution to Reality" at "The 6th Annual Display Search US FPD Conference" held between Mar. 30 and Apr. 1, 2004. It describes a system comprising a number of side light-emitting diodes which are located inside holes in a two-dimensional extended light guide instead of positioned along one or more edges of the light guide. The system utilizes a sophisticated combination of diffusive optical elements which can achieve uniform screen back lighting.

The state of the art in display systems however, does not provide technological or economic solutions for architectural lighting, for which large surfaces need to be illuminated. Therefore there is a need for a new lighting system which can solve the problems identified in the current state of the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a lighting system for creating an illuminated surface. In accordance with an aspect of the present invention, there is provided a lighting system comprising a light-transmissive light guide having one or more surfaces, the light guide having one or more voids defined therein; one or more light-emitting elements for emitting light having one or more wavelengths, one or more light-emitting elements optically coupled with one or more of the one or more voids thereby enabling propagation of the light through the light guide; and a plurality of light redirecting elements optically coupled to the light guide, the light redirecting elements configured to alter the propagation of light through the light guide.

DETAILED DESCRIPTION OF THE INVENTION

Definitions

Figure 1A:
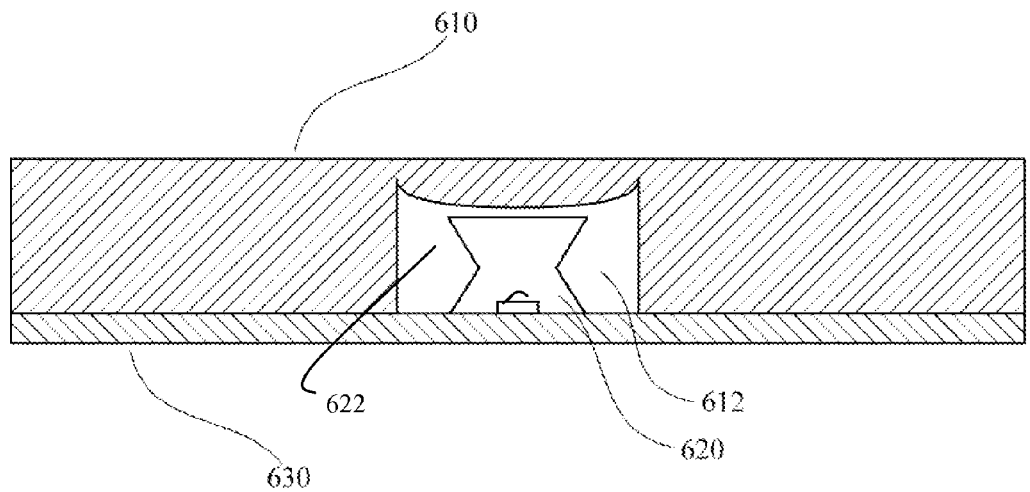
FIG. 1A illustrates a cross section through a lighting system according to one embodiment of the present invention.

The term "light-emitting element" is used to define any device that emits radiation in any region or combination of regions of the electromagnetic spectrum for example, the visible region, infrared and/or ultraviolet region, when activated by applying a potential difference across it or passing a current through it, for example. Therefore a light-emitting element can have monochromatic, quasi-monochromatic polychromatic or broadband spectral emission characteristics. Examples of light-emitting elements include semiconductor, organic, or polymer/polymeric light-emitting diodes, optically pumped phosphor coated light-emitting diodes, optically pumped nano-crystal light-emitting diodes or any other similar devices as would be readily understood by a worker skilled in the art. Furthermore, the term light-emitting element is used to define the specific device that emits the radiation, for example a LED die, and can equally be used to define a combination of the specific device that emits the radiation together with a housing or package within which the specific device or devices are placed.

As used herein, the term "about" refers to a +/−10% variation from the nominal value. It is to be understood that such a variation is always included in any given value provided herein, whether or not it is specifically referred to.

Unless defined otherwise, all technical and scientific terms used herein have the same meaning as commonly understood by someone of ordinary skill in the art to which this invention belongs.

The present invention combines point light sources in combination with a light guide element and light redirecting elements into a system which can emit light across one or more extended surfaces of the light guide and may be designed to be able to emit light uniformly across the extended surfaces. The system comprises one or more light-emitting elements and a light guide in which are defined one or more voids. The light-emitting elements are optically coupled to the light guide by positioning them adjacent to a surface of the light guide, or by positioning them proximal to one or more of the voids. One or more light-emitting elements can be optically coupled to one void such that they emit light into the light guide substantially through that void. Optically coupled to the light guide are a plurality of light redirecting elements for altering the propagation of light through the light guide, thereby enabling light to be emitted from the surface of the light guide in a desired pattern, for example in a uniform illumination pattern.

In one embodiment, as a plurality of light-emitting elements can be positioned over the surface area of the light guide, the size of the light guide and therefore the size of the illuminated surface can be large and can be formed in any desired shape while maintaining the ability to create a desired light pattern emitted from the surface of the light guide.

In another embodiment, when a large surface area is to be illuminated, this area can be provided by a plurality of smaller, tessellating lighting systems according to an embodiment of the present invention, which are formed as tiles. Each of the tiles may be optionally identical, wherein a modular configuration of the tiles can allow for custom surfaces to be covered by standard components in a cost effective manner.

Light Guide

A light guide is a transparent or translucent element which is configured to guide a flow of light therethrough by internal reflection of the light. A light guide comprises one or more voids defined therein.

In an embodiment of the present invention, a light guide can be made of a solid-rigid, solid-flexible or combination thereof type material, wherein the material is further transparent. Examples of these materials can include glass, plastic, plexiglass, acrylic or other similar light transmissive material as would be known to a worker skilled in the art.

In another embodiment of the present invention, a light guide can be configured as a fluid light guide or a hollow light guide.

In one embodiment the fluid light guide comprises an outer sheath with a fluid core. The outer sheath can be configured to be rigid or flexible depending on the intended implementation thereof, while additionally having desired optical characteristics. Appropriate outer sheaths can include acrylic, plexiglass, polypropylene, Aluminium or the like as would be readily understood by a worker skilled in the art. In addition, the fluid core can be a liquid or fluid which has the desired transparent or translucent optical properties. Appropriate fluid cores can be for example water, oil, silicon or the like as would be readily understood by a worker skilled in the art.

In another embodiment of the present invention, the light guide is a hollow light guide which is filled with a gas for example air, nitrogen or the like as would be readily understood by a worker skilled in the art. The outer sheath of the hollow light guide can be highly reflective and manufactured from Aluminium, protectively coated Aluminium, reflectively coated plastic material, a multilayer plastic reflective material for example 3M™ Vicuity™ foil, or the like as would be readily understood. In one embodiment, the hollow light guide is sealed and in another embodiment, the hollow light guide is configured to allow gas flow therethrough, for example air flow.

In one embodiment of the present invention, wherein the light guide is formed from a substantially solid material, the one or more voids defined therein are defined by holes which are formed in the solid material. The holes can be configured as through holes, blind holes or other cavity format as would be readily understood by a worker skilled in the art.

In another embodiment of the present invention, wherein the light guide is a fluid or hollow light guide, the one or more voids can be defined by the fluid or gas which is displaced by the placement of the one or more light-emitting elements within the light guide. Alternately the one or more voids which can be defined within a fluid light guide can be defined by the shaping of the outer sheath of the fluid light guide or hollow light guide in order to provide a region for the placement of the one or more light-emitting elements within the light guide.

In one embodiment, the light guide comprises a regular lattice of uniformly shaped, or varying shaped voids. In another embodiment the light guide can have a regular, irregular or random arrangement of voids, or a combination thereof. In another embodiment the voids can be configured to have the same shape and size or varying one or both of size and shape.

In one embodiment, the light guide can have a diffuse or specular reflective perimeter surface or it can be coated with one or more layers capable of diffuse or specular reflection for light within a desired wavelength regime.

In one embodiment, the light guide can additionally be formed in a desired shape, for example circular, square, rectangular, trapezoid, octagon or other shape as would be known to a skilled worker.

In one embodiment, a desired illumination surface can be provided by the side-by-side placement of a plurality of light guides.

In one embodiment of the present invention, wherein the light guide is substantially a solid material having one or more holes defined therein, the surface of the light guide associated with one or more of the one or more holes can be shaped to provide a desired level of light coupling between a light-emitting element and the hole defined in the light guide. The surface can be polished to improve the coupling of light through that part of the surface and into the light guide. This can enable the reduction of surface reflections thereby enabling the passage of an increased level of light generated by the one or more light-emitting elements into the light guide.

In one embodiment of the present invention, the top of a hole in which a light-emitting element is positioned can be shaped like an inverted cone or other shape in order to refract or reflect light sideways, wherein this light is for example emitted in a substantially forward direction by the one or more light-emitting elements associated with the hole. This configuration of the hole can provide a means for reducing illumination hotspots, for example.

In one embodiment of the present invention, the lighting system can additionally comprise an optical diffuser system for further manipulating the illumination. For example, one or more holographic diffusers or other form of diffuser as would be known to a worker skilled in the art, can be positioned proximal to the light guide.

In one embodiment of the present invention, illumination is emitted from one surface of the light guide, wherein the opposite side can comprise a reflective surface or optical element to redirect any stray light towards the emission surface. Alternately, the light guide can be configured to emit light from two or more surfaces thereof.

In another embodiment of the present invention, the light guide has a shaped surface such that the shaped surface has a predetermined profile. For example, the shaped surface of the light guide can be configured as a curved surface which can result in the altering of propagation of light within the light guide, and may result in the redirection of the light out of the light guide. The shaped surface of the light guide can be configured as one or a combination of cross sectional shapes including sloped, parabolic, concave, convex, elliptical, hyperbolic or other shape as would be readily understood by a worker skilled in the art.

Light-Emitting Elements

The one or more light-emitting elements of the lighting system can be side-emitting, forward-emitting or have any other isotropic, anisotropic, symmetric or asymmetric radiation pattern as would be readily understood by a worker skilled in the art. Furthermore, wherein the lighting system comprises multiple light-emitting elements, the light-emitting elements can have the same or different radiation patterns which can be selected based on the configuration of the lighting system and a desired lighting effect, for example.

In one embodiment, the light-emitting elements can be positioned with other optical elements to avoid bright spots on the light emitting surface under operating conditions. For example, in one embodiment an opaque convex mirror disk or other optical element can be positioned proximal to the tip of one or more light-emitting elements to reflect emitted light sideward. Any one or more of the light-emitting elements can be positioned such that it is optically coupled with a reflector element that can alter the forward or sideways light emission from the one or more light-emitting elements.

In one embodiment, the light-emitting elements can be affixed to a substrate positioned proximal to the light guide or the light-emitting elements can be affixed to the light guide itself. The light-emitting elements can be electrically connected via electrical connections to a suitable controller controlling the supply of electrical power to the light-emitting elements. The electrical connections can be wires, traces, cables or any other form or electrical connection known in the art. The electrical connections can be adhered to the substrate or the light guide and can be made of, for example, traces of electrically conductive material, for example copper, gold, silver, aluminium or the like. In one embodiment of the present invention, the conductive material can be substantially optically transparent for all wavelengths or one or more predetermined wavelength ranges, which are desired to be emitted by the lighting system. For example, an optically transparent conductive material is indium tin oxide, (ITO), or other similar material as would be readily understood by a worker skilled in the art.

In one embodiment of the present invention, the light guide is a solid light guide and the light guide can be coated with Aluminium or other electrically conductive and optically reflective media. Circuit traces can be etched or machined into this coating to electrically connect with the light-emitting elements thereby exposing only a small uncoated surface area. In this embodiment, the coating can serve as a reflector which can enhance the efficiency of the light guide in addition to forming a carrier for the circuit traces.

Light Redirecting Elements

Optically coupled to the light guide are a plurality of light redirecting elements for altering the propagation of light through the light guide, thereby enabling light to be emitted from the surface of the light guide in a desired pattern, for example in a uniform illumination pattern. The light redirecting elements can be configured as one or a combination of light-extraction elements for extracting light from the light guide, light-reflection elements for reflecting light back into the light guide, light-refraction elements for refracting the light into or out of the light guide, or the like as would be readily understood by a worker skilled in the art.

In one embodiment of the present invention, the light redirecting elements and the light guide can be formed as an integral body or the light redirecting elements can be an integral part of one or more light redirecting element sheets which can be optically coupled to the light guide. The light redirecting elements can also be adhered to one or more surfaces of the light guide or the light redirecting sheets.

In one embodiment, the light redirecting elements are indicia, for example dots, which are painted or printed onto the light guide or light redirecting element sheets in a way as would be known to a person skilled in the art. The light redirecting elements can have a desired size and a desired distribution which is suitable for generating a desired lighting impression in accordance with the size of the lighting system, desired viewing angle, viewing distance or lighting distance, for example. The desired distribution can be formed as a statistical distribution, a random distribution or the like as would be readily understood by a worker skilled in the art.

In one embodiment, the light redirecting elements are protrusions or depressions formed in the light guide. The light redirecting elements can be facets of a structured or painted surface of the light guide or the light redirecting element sheets. The light redirecting elements can be facets of an embossed, textured, molded, machined or sanded, regular or irregular surface. In addition, the light redirecting elements can be positioned at an outer surface, near-surface layer, internal layer or the like of the light guide or light redirecting element sheets, as would be readily understood.

In one embodiment of the present invention, the light guide is configured with two or more different indices of refraction, wherein interfaces between the regions of the material having two different indices of refraction can form the light redirecting elements. For example the body material of the light guide can have a first index of refraction and regions of the light guide can have a second index of refraction. As would be readily understood by a worker skilled in the art, a light guide can be configured to have a plurality of different indices of refraction, wherein the position of interfaces resulting from the different indices of refraction can be configured to result in a desired manipulation of the light transmitted by the light guide. For example in one embodiment, a light guide can be configured to have a body material having a first index of refraction and further comprise a distribution of embedded shapes therein, wherein these embedded shapes can have a second index of refraction. For example, the embedded shapes can be formed from a material different from the body material of the light guide, air pockets formed in body material of the light guide or the like as would be readily understood by a worker skilled in the art. The embedded shapes can be formed as a sphere, cube, rhombus, pyramid, cone or other shape as would be known to a worker skilled in the art.

The light redirecting elements can reflect or refract light in predetermined portions based on their inherent optical characteristics and their position relative to the light sources. The surface density distribution of the light redirecting elements per unit area of the light guide can vary and can be designed such that the distribution improves and assists in the generation of a desired lighting impression. For example, the light redirecting elements may be more densely positioned as the distance from a light-emitting element increases. This configuration can provide a means for generating a uniform level of light extraction from the light guide, thereby enabling the creation of a uniformly emitting plane of light, for example.

The invention will now be described with reference to specific examples. It will be understood that the following examples are intended to describe embodiments of the invention and are not intended to limit the invention in any way.

EXAMPLES

Figure 1B:
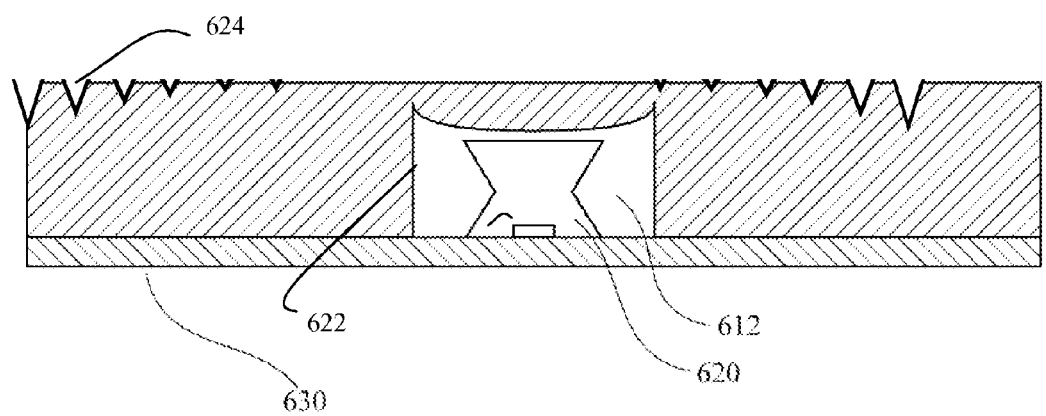
FIG. 1B illustrates a cross section through a lighting system according to another embodiment of the present invention.

FIG. 1A illustrates an elevational cross section of an embodiment of the lighting system according to the present invention. The lighting system comprises a light-transmissive sheet or light guide 610 which defines a hole 612. In addition, the lighting system comprises a side light-emitting element 620 positioned within the hole in order to substantially maximize light extraction into the light-transmissive sheet. The light-emitting element 620 is affixed to a substrate 630 which provides traces and pathways for the supply of electronic signals and power to the light-emitting element. The traces and pathways are not illustrated. A primary optic 622 is optically coupled to the light-emitting element 620 enabling the redirection of the light sideways. The light redirecting elements can be formed between the light-transmissive sheet and the substrate (not shown) or can be formed on the top of the light-transmissive sheet as illustrated in FIG. 1B. In one embodiment, the light redirecting elements may positioned closer together as the distance to the centre of the light guide increases. In another embodiment, the light redirecting elements can be positioned equidistant and can increase in depth. The variation in the spacing or depth of the light redirecting elements can follow a logarithmic curve, linear curve or the like as would be readily understood by a worker skilled in the art.

Figure 2:
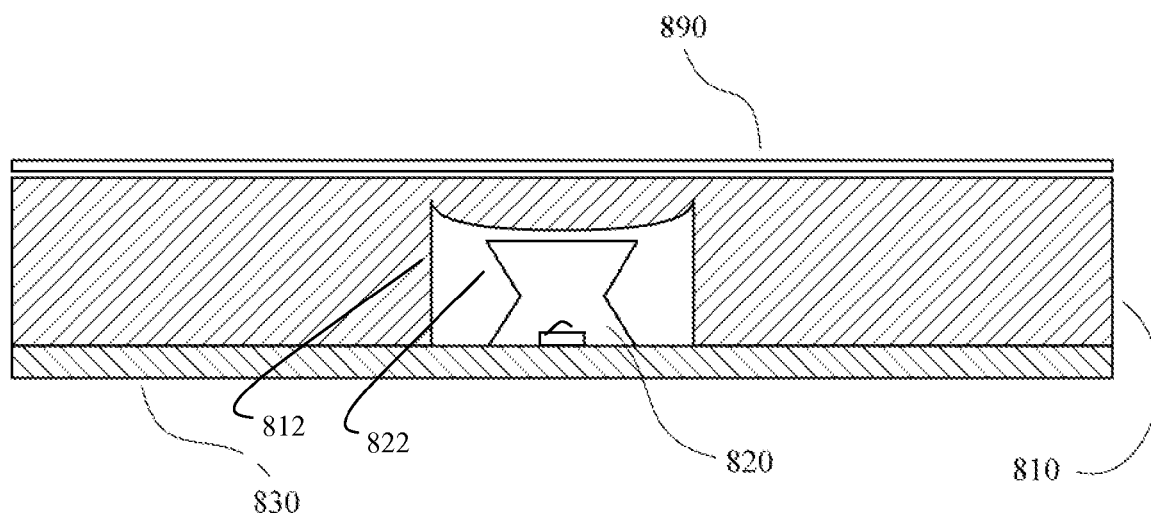
FIG. 2 illustrates a cross section through a lighting system according to another embodiment of the present invention.

FIG. 2 illustrates an elevated cross section of another embodiment of the lighting system according to the present invention. The lighting system comprises a light-transmissive sheet or light guide 810, with a hole 812 formed therein, a light-emitting element 820, and a substrate 830. The light-emitting element 820 is optically coupled to primary optic 822 which directs the light sideways. In addition, this embodiment of a lighting system comprises a secondary diffuser 890. The secondary diffuser can, for example, generate a more uniform lighting impression or provide improved directional illumination or an improved viewing angle. The light redirecting elements (not illustrated) can be formed between the light-transmissive sheet and the substrate or can be formed on the top of the light-transmissive sheet.

Figure 3A:
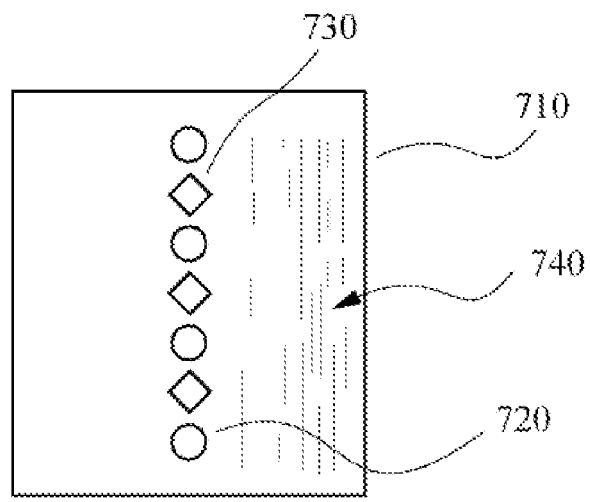
FIG. 3A illustrates a layout of light-emitting elements and reflective elements which are optically coupled to a light guide according to one embodiment of the present invention.
Figure 3B:
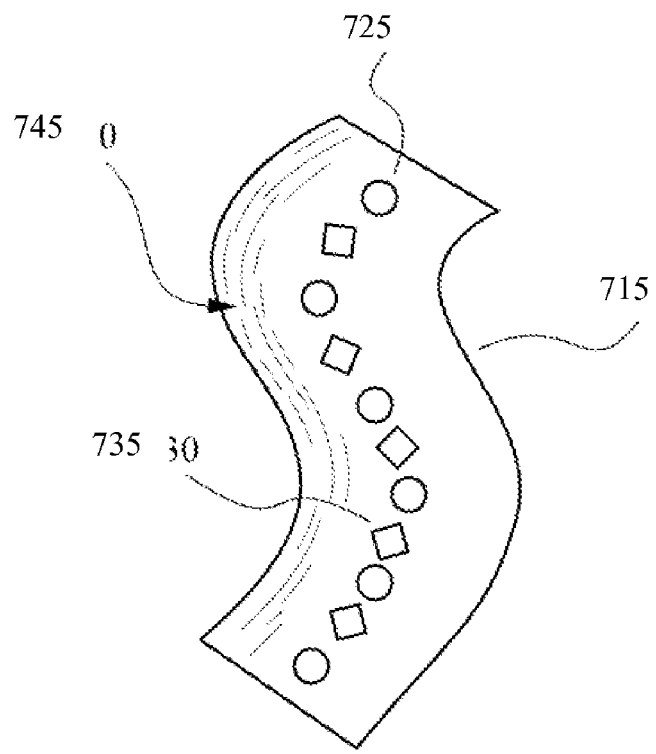
FIG. 3B illustrates a layout of light-emitting elements and reflective elements which are optically coupled to a light guide according to another embodiment of the present invention.

FIG. 3a illustrates a top view of an embodiment of the lighting system according to the present invention. The lighting system comprises a rectangular light-transmissive sheet or light guide 710, light-emitting elements 720, light redirecting elements 740, and reflector elements 730. The reflector elements can be configured to reflect light into the light guide and/or to reduce or inhibit light interference between adjacent light-emitting elements. FIG. 3b is a top view of another embodiment of the lighting system according to the present invention, wherein the lighting system comprises an irregular shaped light-transmissive sheet 715, light-emitting elements 725, light redirecting elements 745, and reflector elements 735. It is understood, that the lighting system can comprise arbitrarily shaped light-transmissive artefacts or reflector elements, which can have any two-dimensional flat or non-flat, or three dimensional warped shapes.

Figure 4:
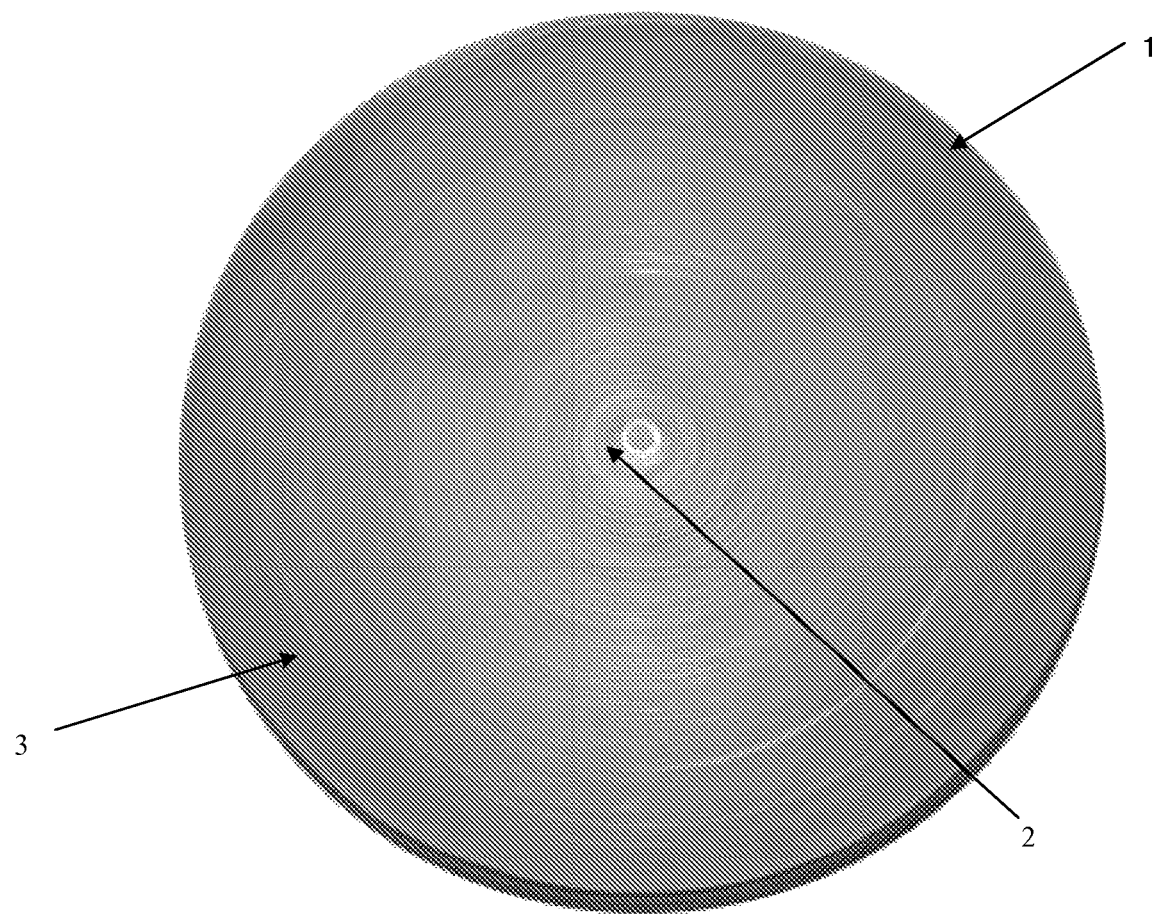
FIG. 4 is a photograph of a top view of a lighting system according to one embodiment of the present invention, the lighting system under operating conditions and comprising a single illumination location.

FIG. 4 illustrates a photograph of a top view of an embodiment of the lighting system according to the present invention. The lighting system comprises a disk shaped acrylic light-transmissive light guide 1, a side-emitting amber light emitting diode (LED) 2 which is positioned in a hole in the center of the disk, the LED is partially hidden by the light guide and only accessible from the open side of the hole on the opposite side of the light guide. The light guide has a plurality of concentric grooves 3 on the top surface which act as light redirecting elements.

Figure 5:
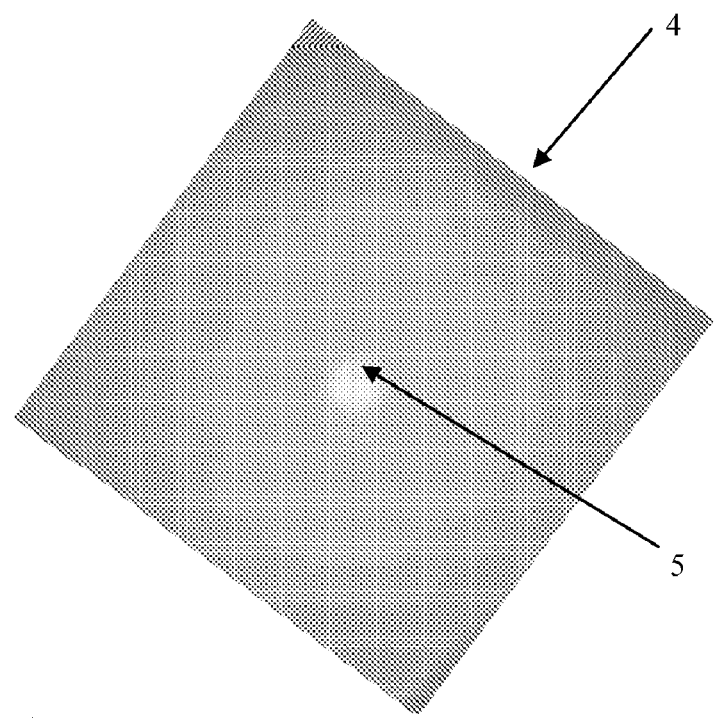
FIG. 5 is a photograph of a top view of a lighting system according to another embodiment of the present invention, the lighting system under operating conditions and comprising a single illumination location.

FIG. 5 illustrates a photograph of a top view of another embodiment of the lighting system according to the present invention, and is similar to the one illustrated in FIG. 4. This embodiment of the lighting system has a differently machined acrylic light guide 4 surface, which can generate a different shaped uniform lighting impression under operating conditions. Light propagates from the LED 5 in a symmetrical pattern, namely in a circular pattern with the LED at the centre thereof. In this embodiment, the light redirecting elements optically coupled to the light-transmissive light guide are configured, for example in a square pattern to extract light from the light guide to form a relatively square light emission impression. It would be readily understood that alternate non-circular configurations of the light redirecting elements can provide a means for generating alternate light emission impressions, for example rectangular, trapezoidal, elliptical and the like.

Figure 6:
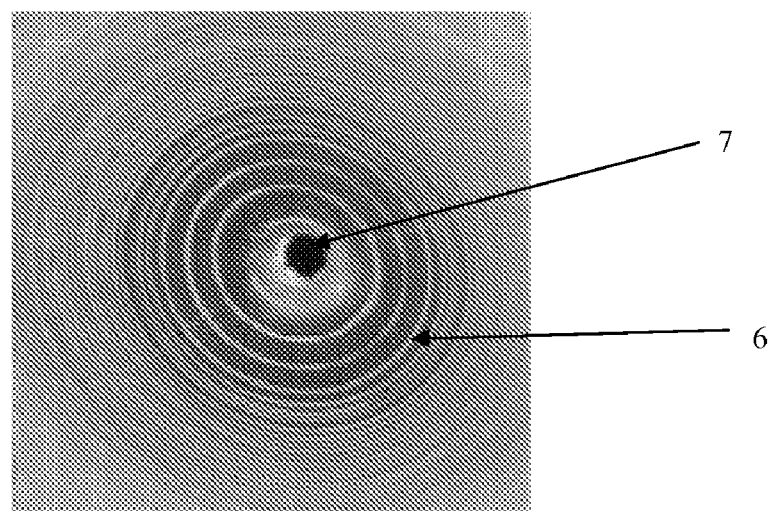
FIG. 6 is a photograph of a top view of a lighting system according to another embodiment of the present invention, the lighting system under operating conditions and comprising a single illumination location.

FIG. 6 illustrates a photograph of a top view of another embodiment of the lighting system according to the present invention. This embodiment illustrates how the brightness per surface area can be adjusted by, for example, changing the density of the light-redirecting elements 6, which in this embodiment are circular grooves. In this embodiment, the light emitted by the LED towards the observer which can be identified as the dark spot 7 at the centre of the light guide. It is understood, that there are many other shapes, forms and density distributions of light redirecting elements that can be utilized to aid in the generation of a desired lighting impression.

In one embodiment one or more optical elements for redirecting, diffusing or blocking the light directed forwards by a light-emitting element can be placed directly over the light-emitting element, on the top surface of the light guide or inside the hole in which the light-emitting element is positioned. Examples of an optical element can be refractive or reflective elements such as lenticular elements, Fresnel lenses or specular reflective elements. For example, a bright spot is usually more obvious to an observer than a dark spot and therefore in one embodiment, wherein excess forward-emitted light can be blocked, the optical element can be a partially or fully opaque element such as a printed or applied "dot". Optionally the optical element can be configured to reflect and redirect the forward-emitted light laterally in order to improve the efficiency of the lighting system, for example. In one embodiment, this redirection of the light can be achieved by appropriately shaping the inside top surface of the hole within the light guide that houses the light-emitting element or by positioning an additional optical element with similar features proximate to the top of the light-emitting element, for example. In one embodiment, the top surface of the hole can be conically shaped to sideways refract or reflect all or a portion of the forward-emitted light while being partially transmissive.

Figure 7:
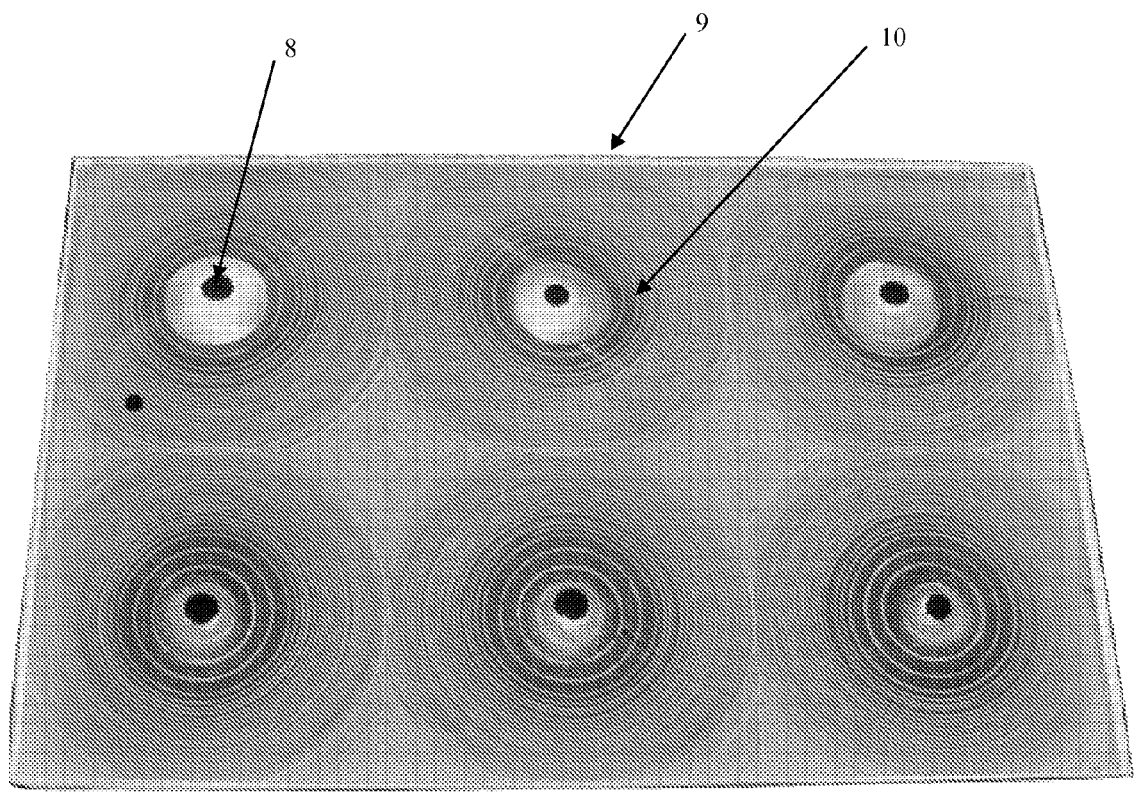
FIG. 7 is a photograph of a top view of a lighting system according to another embodiment of the present invention, the lighting system under operating conditions and comprising multiple illumination locations.

FIG. 7 illustrates a photograph of a top view of another embodiment of the lighting system according to the present invention. The lighting system comprises six side-emitting LEDs 8 each positioned within its own cavity within an integrally formed acrylic light guide. In addition, the surface of the light guide 9 is segmented to provide a predetermined alignment of a plurality of light redirecting grooves 10 per each LED.

Figure 8:
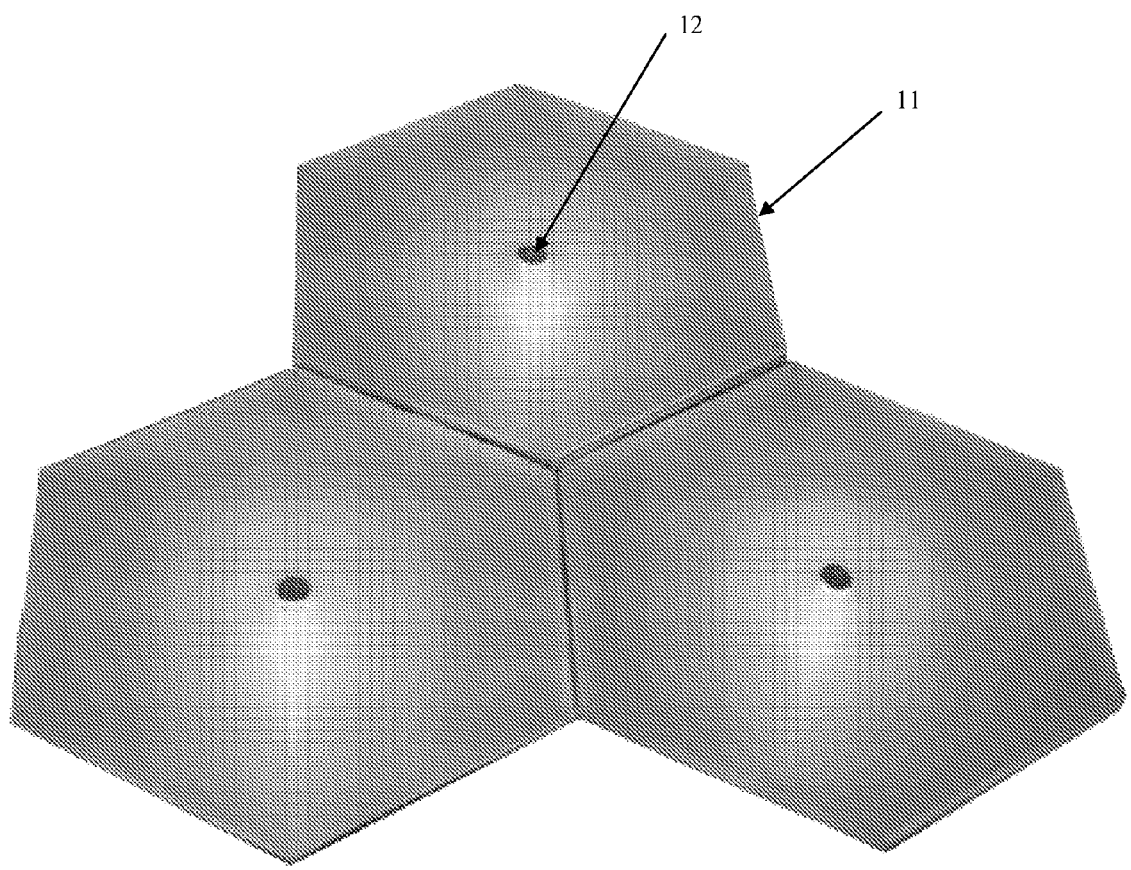
FIG. 8 is a photograph of a top view of a lighting system according to another embodiment of the present invention, the lighting system under operating conditions and comprising multiple illumination locations.

FIG. 8 illustrates a photograph of a top view of another embodiment of the lighting system according to the present invention. The lighting system comprises three hexagonally shaped light guides 11 with side-emitting LEDs 12. Each LED is positioned within its own cavity within one of the hexagonally shaped light guides. The surface of the light guides is sanded in a predetermined way, thereby forming the light redirecting elements which are configured to aid in the creation of the illustrated lighting impression.

Figure 9:
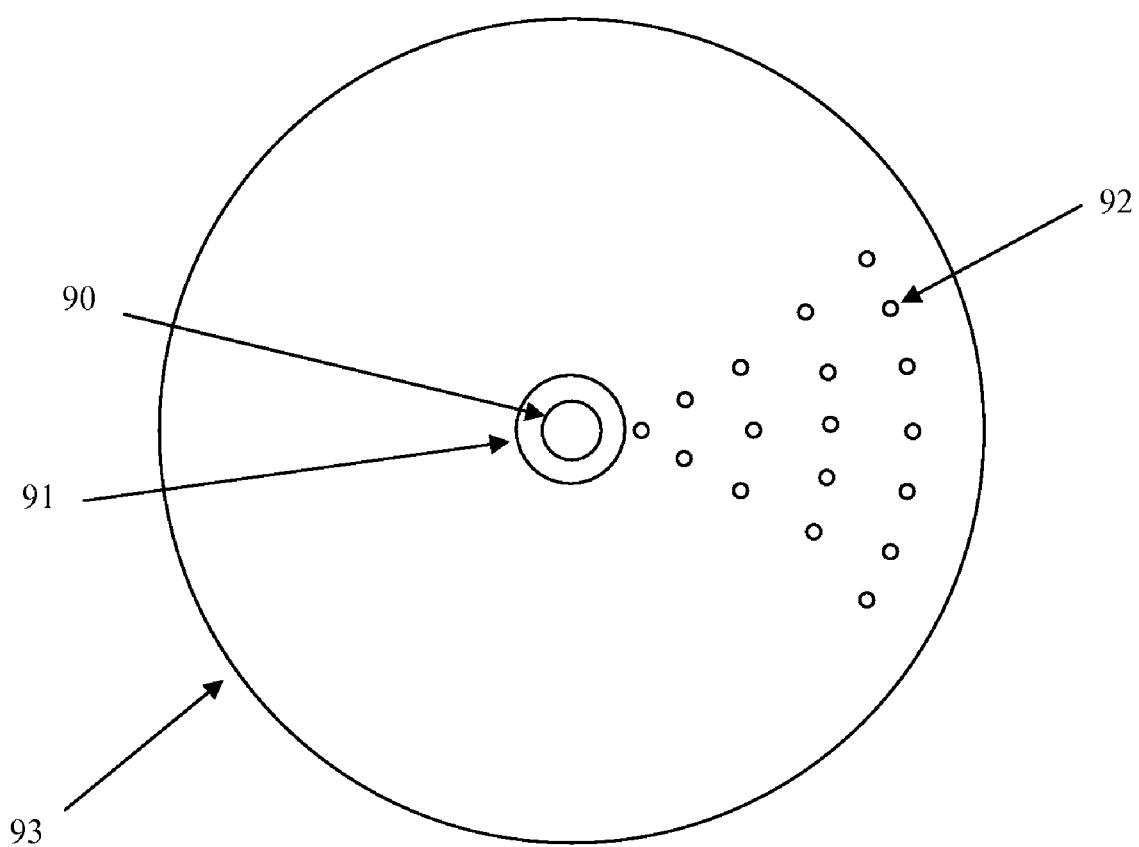
FIG. 9 illustrates a top view of a lighting system according to another embodiment of the present invention, wherein light redirecting elements are formed within the light guide.

FIG. 9 illustrates a circular lighting system according to one embodiment of the present invention, in which the light guide has varying indices of refraction, wherein these variations of the index of refraction can be strategically positioned for a desired manipulation of the light coupled within the light guide. A light-emitting element and optic 90 are shown in the centre of a hole 91 in the centre of the light guide 93. The body of the material of the light guide 93 has an index of refraction $n_1$ and distributed within this material is a distribution of spheres 92 of a material with an index of refraction $n_2$ different to $n_1$. This distribution of spheres forms the light redirecting elements and can be configured to provide a desired manipulation of the light coupled into the light guide, for example the distribution the spheres can be a statistical distribution, random distribution or the like. The change in index of refraction can act as light redirecting elements, which can provide for the redirection of light coupled within the light guide, out thereof enabling the generation of an illuminated surface. In one embodiment, the rear surface of the light guide, namely the surface opposite the surface to be illuminated, is covered with a reflecting layer which can provide a means for preventing loss of light which is redirected towards the rear surface by the spheres.

In one embodiment, the density of the spheres positioned within the light guide can increase with distance from the centre of the light guide, wherein this configuration can provide a means for generating a more even lighting impression by the lighting system.

Other sizes and shapes of material with index of refraction $n_2$ are possible, for example ellipsoid, octahedron, polyhedron or other shape as would be readily understood by a worker skilled in the art. In one embodiment, the shape and size of the material with an index of refraction $n_2$, can vary within a particular light guide.

Figure 10:
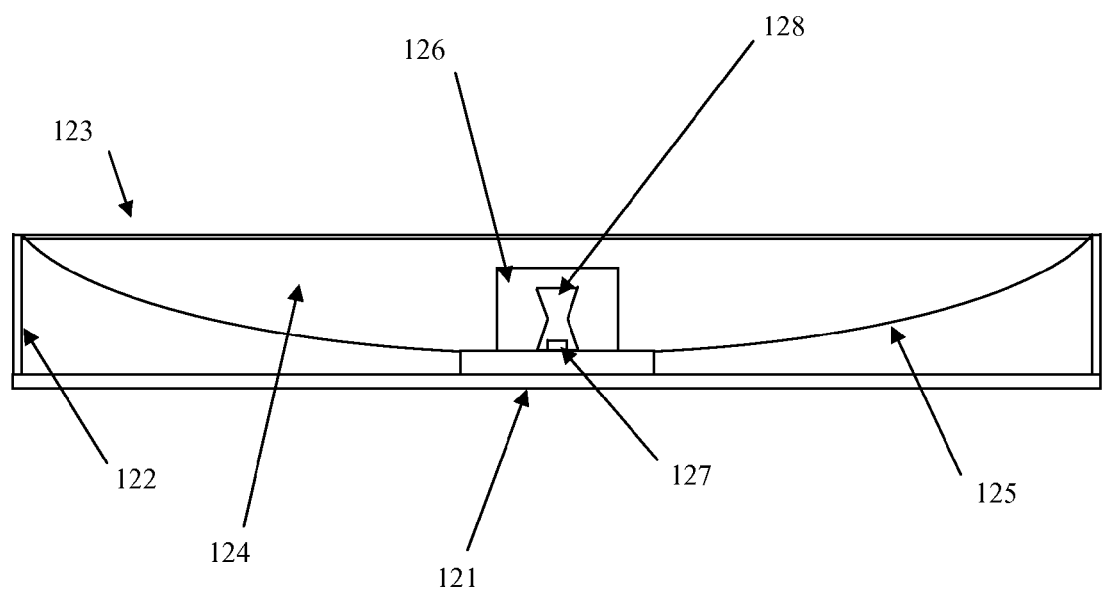
FIG. 10 illustrates a cross section through a lighting system according to another embodiment of the present invention, wherein the light guide has a profiled surface.

FIG. 10 illustrates a lighting system according to one embodiment of the present invention wherein the light guide has a profiled surface. A recess 126 in the light guide 124 provides for the positioning of a light-emitting element 127 and optic 128 mounted on a substrate 121. The rear surface 125 of the light guide is configured as a curve which can provide a means for reflecting the light coupled within the light guide, out towards to the illumination surface of the lighting system. In this configuration the shape of the rear surface of the light guide results in this surface acting as light redirecting elements. The illumination surface can be covered by a transmissive cover 123. In alternate embodiments, the rear surface 125 may take a variety of forms, for example wedged, parabolic, hyperbolic, stepped, faceted, a combination of these or other suitable profile as would be readily understood by a worker skilled in the art. The rear surface 125 may optionally be coated with a reflective layer. The shaping of the rear surface of the light guide may reduce the stability thereof within the lighting system and therefore in one embodiment there is provided a support structure 122 which is fixed around the perimeter of the light guide. Alternately, the edges of the substrate may extend towards the edges of the light guide in order to provide support thereto.

In one embodiment of the present invention, the light guide can further comprise additional light redirecting elements which may be configured as forms projecting out from or into the rear surface 125. In another embodiment, the light guide can comprise light redirecting elements configured as spheres, or alternate shapes wherein these elements have an index of refraction different from that of the main material of the light guide.

Figure 11:
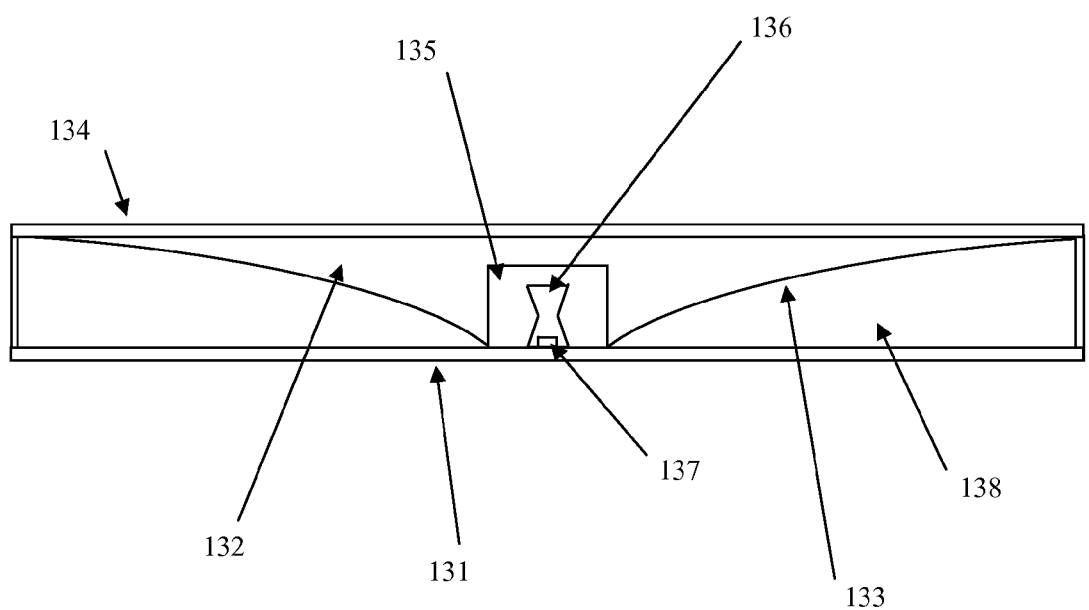
FIG. 11 illustrates a cross section through a lighting system according to another embodiment of the present invention, wherein the light guide has a profiled surface.

FIG. 11 illustrates a variation of the embodiment shown in FIG. 10. The lighting system comprises a substrate 131, light-emitting element 137 and optic 136 in a hole 135 in the light guide. In this embodiment the curvature of the rear surface 133 of the light guide 132 is configured in an opposite sense to that illustrated in FIG. 10, for example this curvature may be hyperbolic. In this configuration the shape of the rear surface of the light guide results in this surface acting as light redirecting elements. The illumination surface can be covered by a transmissive cover 134. Region 138 may be absent of any material, or it may be a material with a lower index of refraction than the material which forms the light guide 132. In one embodiment, the rear surface 133 may be coated with a reflective coating.

In one embodiment of the present invention, the light guide can further comprise additional light redirecting elements which may be configured as forms projecting out from or into the rear surface 133. In another embodiment, the light guide can comprise light redirecting elements configured as spheres, or alternate shapes wherein these elements have an index of refraction different from that of the main material of the light guide.

Figure 12:
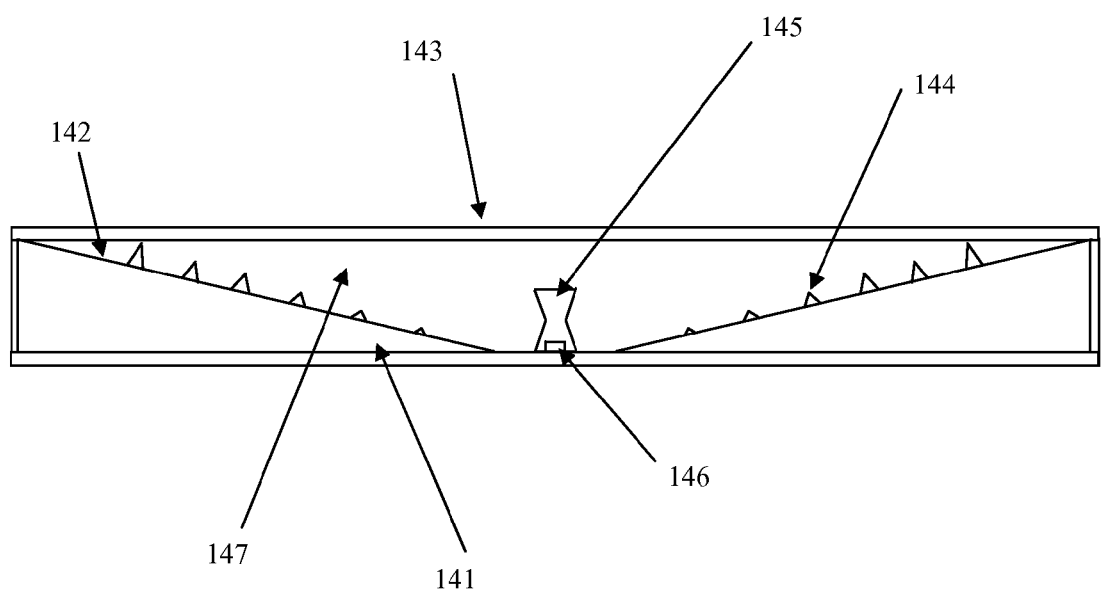
FIG. 12 illustrates a cross section through a lighting system according to another embodiment of the present invention.

FIG. 12 is an elevated cross sectional view of a lighting system according to another embodiment of the present invention. The lighting system comprises a substrate 141 formed with a shaped recess 142 and cover 143 which together can from the outer sheath of the light guide, and a fluid or gas is provided therebetween. The cover 143 may be clear, translucent, diffractive or diffusive, or have position dependent optical properties. In addition, the shaped recess 142 may take one or more of a variety of profiles, for example saucer, wedged, parabolic, hyperbolic, stepped, faceted, or the like or may be formed from a combination thereof. Above the recess is volume 147 which may be filled with air, gas or liquid. At the centre of the light guide is a light emitting element 146 and sideways reflecting optic 145. On the shaped recess 142 of the substrate 141 there are light redirecting elements 144 each for reflecting a portion of the light through the cover 143. The light redirecting elements can take a wide variety of shapes, sizes and distributions. For example, in this embodiment the size of the light redirecting features increases towards the edges of the lighting system. The light redirecting features may be optional in which case the surface 142 will be smooth. In addition, the light redirecting elements 144 and the surface 142 can be coated with a reflective coating.

Figure 13:
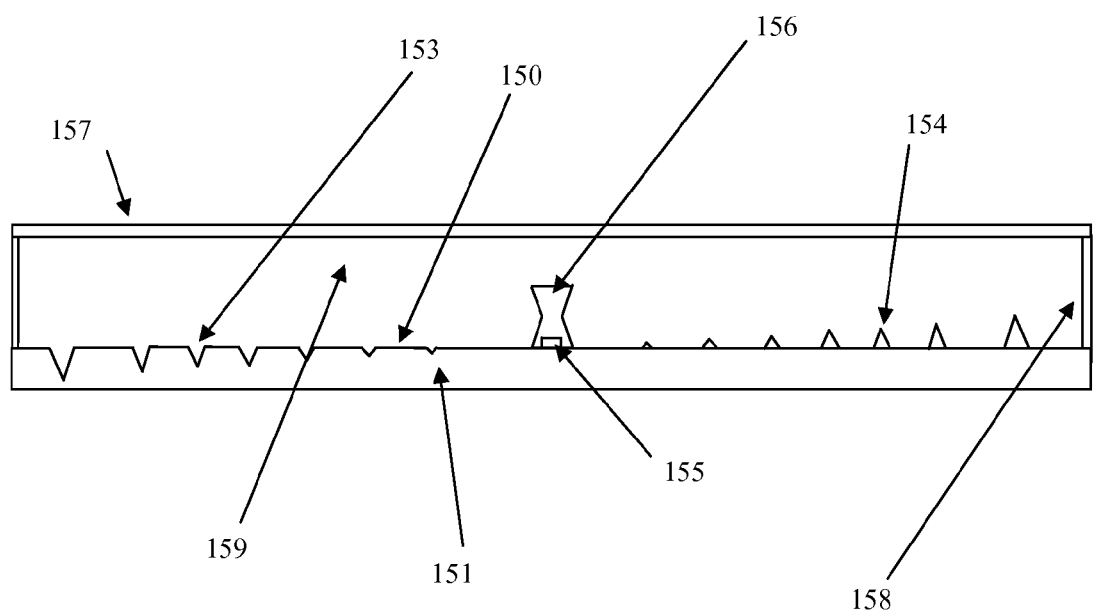
FIG. 13 illustrates a cross section through a lighting system according to another embodiment of the present invention.

FIG. 13 is an elevated cross sectional view of a lighting system according to another embodiment of the present invention. The lighting system comprises a substrate 151 with which the light redirecting elements are integrally formed. The light redirecting elements may be indentations 153 in or projections 154 on the surface 150 of the substrate 151. A supporting structure 158 holds the cover 157 at a distance from the substrate thereby forming a space 159 therebetween which can be filled with a fluid or gas thereby forming the fluid light guide or hollow light guide. At the centre of the tile is a light emitting element 155 and optic 156. The light redirecting elements can take a wide variety of shapes, sizes and distributions. For example, in this embodiment the size of the light redirecting features increases towards the edges of the lighting system. In addition, the light redirecting elements 153, 154 and the surface 150 can be coated with a reflective coating.

Figure 14:
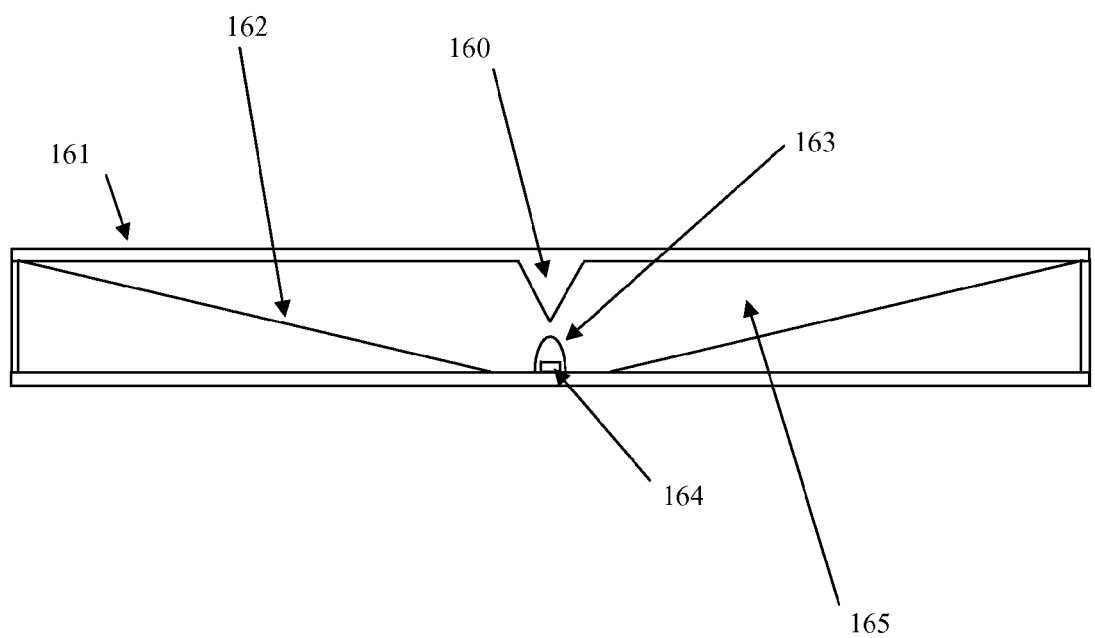
FIG. 14 illustrates a cross section through a lighting system according to another embodiment of the present invention.

FIG. 14 is an elevated cross sectional view of a lighting system according to another embodiment of the present invention, wherein this embodiment is a modification of that illustrated in FIG. 12. The reflective surface 162 of the shaped recess does not have additional light redirecting features, and therefore the shaped recess forms the light redirecting elements associated with this embodiment. The cover 161 has an integral inverted conical structure 160 for redirecting the strongest forward emitted light sideways, in order to prevent a bright spot in the centre of the illuminated cover 161. The conical structure 160 may be fabricated as a separate component to the cover 161 and may be attached using an adhesive. The conical structure 160 is not restricted to a conical shape and may take on other forms, with different diffusive or reflective properties, and can be selected depending on the desired optical properties thereof as would be readily understood by a worker skilled in the art. There is a region 165 between the cover 161 and the surface 162 which is filled with a fluid or gas thereby forming the fluid light guide or hollow light guide. The shaped recess may take a curved sectional profile, faceted profile, stepped profile or any other suitable profile. In this embodiment, the light-emitting element light source is shown with a hemispherical optic 163 and LED die 164.

A lighting system according to embodiments of the present invention can be designed and optimized for intended direct viewing or it can be designed and optimized for lighting other objects. It is understood that, when designed or optimized accordingly, the characteristics of some or all of the components and elements of the lighting system may differ substantially and materially and some elements may be present in an embodiment which is intended for direct viewing but not in an embodiment which is intended for lighting of other objects. It is understood, that the lighting system can comprise a sheet with two opposing surfaces which can emit light either through one or on both opposing surfaces simultaneously.

The disclosure of all patents, publications, including published patent applications, and database entries referenced in this specification are specifically incorporated by reference in their entirety to the same extent as if each such individual patent, publication, and database entry were specifically and individually indicated to be incorporated by reference.

It is obvious that the foregoing embodiments of the invention are exemplary and can be varied in many ways. Such present or future variations are not to be regarded as a departure from the spirit and scope of the invention, and all such modifications as would be obvious to one skilled in the art are intended to be included within the scope of the following claims.

We claim:
1. A lighting system comprising:
   a light-transmissive light guide having one or more surfaces, the light guide having one or more voids defined therein;
   one or more light-emitting elements for emitting light having one or more wavelengths, one or more light-emitting elements optically coupled with one or more of the one or more voids thereby enabling propagation of the light through the light guide;
   one or more sideways reflecting optics optically coupled to said one or more light-emitting elements
   a plurality of light redirecting elements optically coupled to the light guide and positioned within said void containing said light-emitting element, the light redirecting elements configured to alter the propagation of light through the light guide;
   wherein said light-transmissive light guide has a shaped rear surface and a transmissive cover and said void containing said light-emitting element extends from said shaped rear surface to said transmissive cover;
   wherein said shaped rear surface extends outward from said sideways reflecting optics and towards said transmissive cover, said shaped rear surface thereby redirecting light from said light-emitting element towards said transmissive cover;
   said shaped rear surface extending upwardly towards said transmissive cover and having at least a portion being either linear and non-linear between said light-emitting element and said transmissive cover.

2. The lighting system according to claim 1, wherein the light guide is a solid light guide and the light guide is formed from a solid-rigid material or a solid-flexible material or a combination thereof.

3. The lighting system according to claim 2, wherein each of the one or more of the voids is selected from the group comprising: a blind hole, a through hole and a cavity.

4. The lighting system according to claim 2, wherein the light guide is coated with transparent circuit traces.

5. The lighting system according to claim 2, wherein the light guide is coated with a material having reflective and conductive properties, wherein circuit traces are formed in the material.

6. The lighting system according to claim 1, wherein the light guide is a fluid light guide.

7. The lighting system according to claim 1, wherein the light guide is a hollow light guide.

8. The lighting system according to claim 1, wherein the one or more voids are arranged in a regular arrangement or an irregular arrangement or a random arrangement or a combination thereof.

9. The lighting system according to claim 1, wherein the light guide has a first surface and a second surface, wherein light is emitted from the first surface and the second surface is a reflective surface.

10. The lighting system according to claim 1, wherein the one or more light-emitting elements are configured to have a radiation pattern selected from the group comprising: isotropic, anisotropic, symmetric and asymmetric.

11. The lighting system according to claim 1, wherein each of the plurality of light redirecting elements is a light reflection element or a light extraction element or a light refraction element or a combination thereof.

12. The lighting system according to claim 1, wherein the light guide and the light redirecting elements are formed as an integral body.

13. The lighting system according to claim 1, wherein at least some of the light redirecting elements are formed in a sheet and the sheet is optically coupled to the light guide.

14. The lighting system according to claim 1, wherein at least some of the light redirecting elements are indicia and the indicia are painted or printed on the light guide.

15. The lighting system according to claim 1, wherein at least some of the light redirecting elements are formed in the light guide and the light redirecting elements are protrusions or depressions or a combination thereof.

16. The lighting system according to claim 1, wherein at least some of the light redirecting elements are formed on a surface of the light guide, and the light redirecting elements are embossed or textured or molded or machined or sanded or a combination thereof on the surface.

17. The lighting system according to claim 1, wherein the light guide has a first index of refraction and at least some of the light redirecting elements have a second index of refraction, wherein the first index of refraction is different from the second index of refraction.

18. The lighting system according to claim 17, wherein at least some of the light redirecting elements are embedded shapes positioned within the light guide.

19. The lighting system according to claim 17, wherein at least some of the light redirecting elements are air pockets formed in the light guide.

20. The lighting system according to claim 1, wherein a predetermined number of the light redirecting elements are associated with a particular light-emitting element, the predetermined number of light redirecting elements have a distribution density, and the distribution density increases as distance from the particular light-emitting element increases.

21. A lighting system, comprising:
a substrate formed with a shaped recess and a light transmissive cover, said light transmissive cover and said substrate forming a light guide;
a light emitting element substantially at the center of said light guide and having an optically associated sideways reflecting optic;
wherein said shaped recess extends upwardly generally from said light-emitting element towards said light transmissive cover;
said area between said cover and said shaped recess forming a void;
said void being filled with either liquid, gas or air;
a plurality of light redirecting elements on said shaped recess of said substrate, each of said plurality of light redirecting elements reflecting a portion of light emitted by said light emitting element through said light transmissive cover;
wherein said shaped recess further acts to redirect light from said light emitting element upward towards said light transmissive cover to optically redirect said light outward and away from said light emitting element;
at least a portion of said light redirecting elements being having a reflective coating.

22. The lighting system of claim 21 wherein said shaped recess is generally curved upwardly towards said light transmissive cover.

23. The lighting system of claim 21 wherein said void substantially surrounds said sideways reflecting optic and leaves a portion of said light guide exterior of said void.

* * * * *